US005469276A

United States Patent [19]
Shu

[11] Patent Number: 5,469,276
[45] Date of Patent: Nov. 21, 1995

[54] METHOD AND APPARATUS FOR REDUCING ARTIFACTS IN HALFTONE IMAGES USING GRAY BALANCE CORRECTION

[75] Inventor: Joseph S. Shu, San Jose, Calif.

[73] Assignee: Seiko Epson Corporation, Japan

[21] Appl. No.: 320,539

[22] Filed: Oct. 11, 1994

[51] Int. Cl.$^6$ .......................... H04N 1/52; H04N 1/405; G06T 5/00
[52] U.S. Cl. .......................... 358/534; 358/455; 358/456; 358/458; 382/275; 395/109
[58] Field of Search .................................. 358/534, 456, 358/458, 455, 465, 298, 536; 382/275; 395/109

[56] References Cited

U.S. PATENT DOCUMENTS

| | | | |
|---|---|---|---|
| 4,955,065 | 9/1990 | Ulichney | 358/456 |
| 5,018,085 | 5/1991 | Smith, Jr. | |
| 5,068,914 | 11/1991 | Klees | |
| 5,121,195 | 6/1992 | Seki et al. | 358/455 |
| 5,220,620 | 6/1993 | Nakano et al. | |
| 5,271,095 | 12/1993 | Yamada | 358/298 |
| 5,278,670 | 1/1994 | Eschbach | 358/455 |
| 5,303,071 | 4/1994 | Kakimura | |

OTHER PUBLICATIONS

*Angling for Color*, B. Fraser, *Publish* Jun. (1991) pp. 74–82.
Society for Information Display Intern. Symposium Digest of Technical Papers vol. XXV, San Jose, Calif., Jun. 14–16, (1994); Adaptive Error Diffusion for Multiresolution Rendering, P. W. Wong, pp. 801–804.

Society for Information Display Intern. Symposium Digest of Technical Papers vol. XXV, San Jose, Calif., Jun. 14–16, (1994); An Efficient Implementation for Stochastic DBS, T. J. Flohr et al. pp. 797–800.

Society for Information Display Intern. Symposium Digest of Technical Papers vol. XXV, San Jose, Calif., Jun. 14–16, (1994); The Blue–Noise Mask and Its Comparison with Error Diffusion in Color Halftoning, M. Yao et al., pp. 805–808.

*Primary Examiner*—Scott A. Rogers

[57] ABSTRACT

A gray balance correction technique eliminates artifacts, caused by the accumulation of diffusion errors, from a predominantly "gray" tonal area of a halftone image. According to the technique, pixel tonal values associated with three input colors are initially examined to detect a condition that specifies production of a gray image area. Upon detecting this condition, errors from previously processed pixels are averaged prior to being "diffused" among these input color pixels. Thereafter, the input pixels are processed in accordance with conventional halftoning operations and the resulting binary pixel values are passed to an output buffer for printing. Averaging of the errors prior to error diffusion ensures that the detected condition is maintained throughout preprocessing of those input color pixel values.

20 Claims, 4 Drawing Sheets

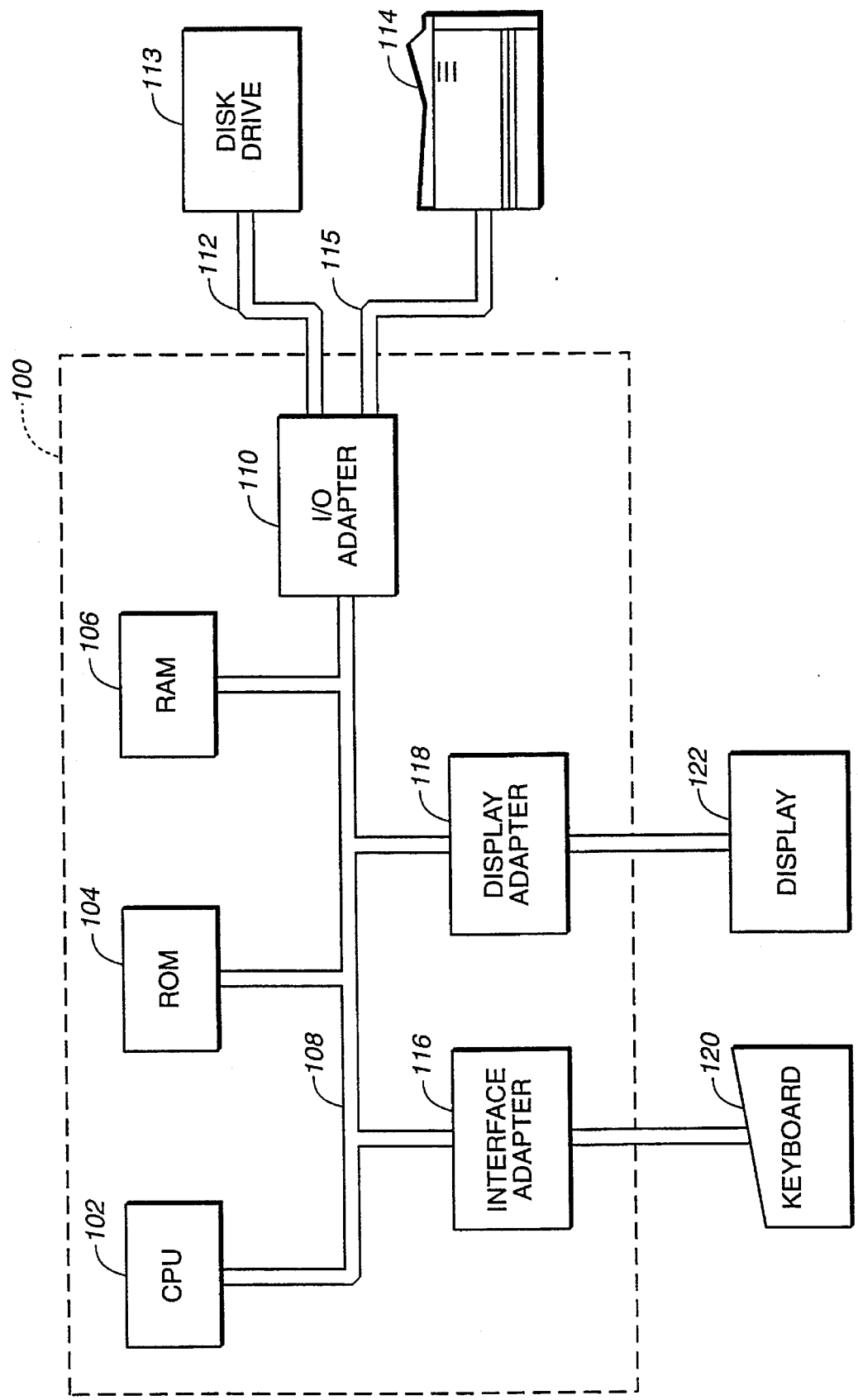
FIG._1

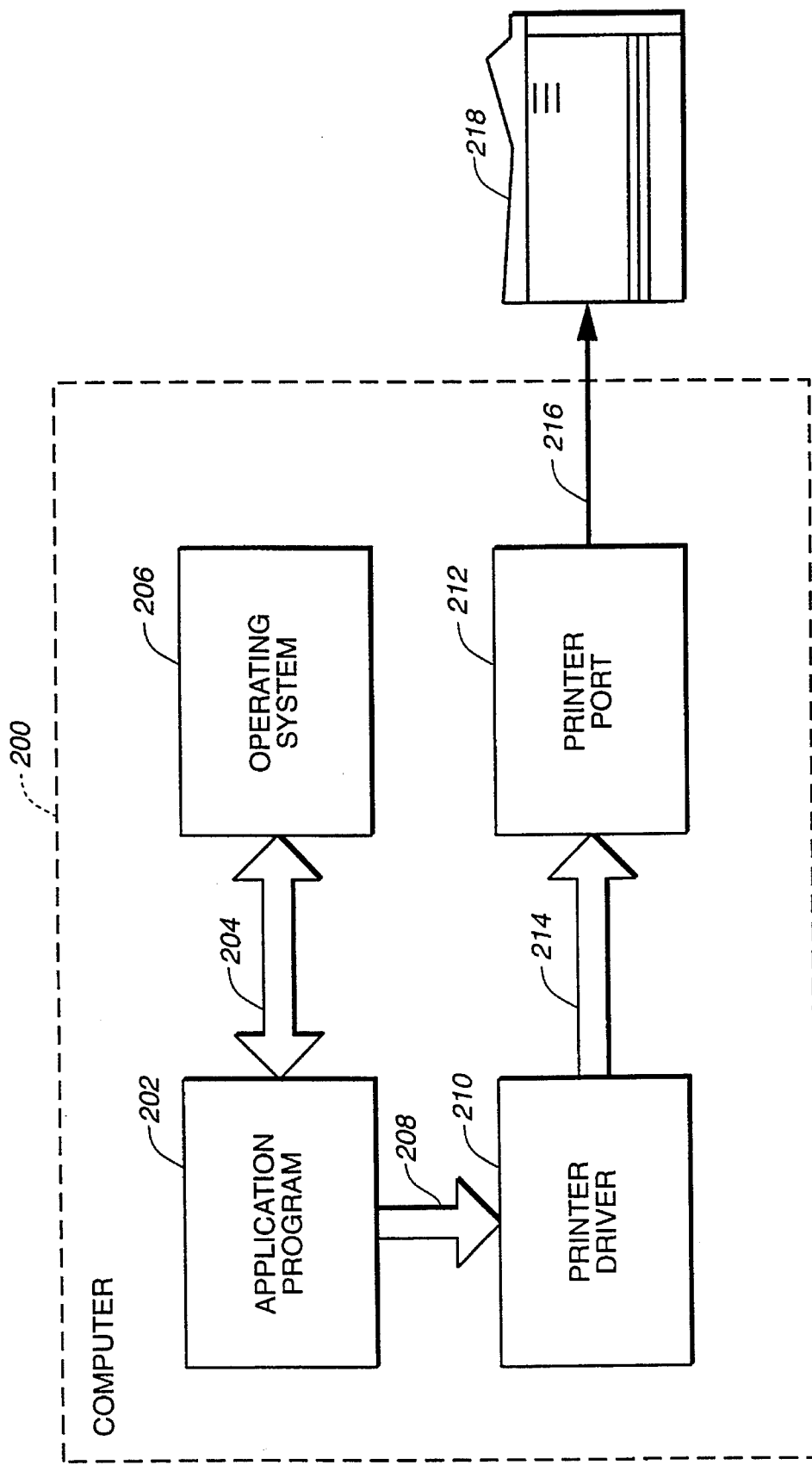
FIG._2 (PRIOR ART)

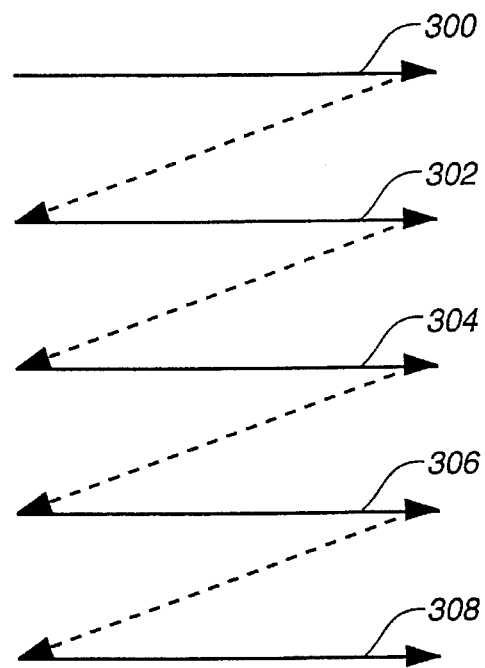
FIG._3
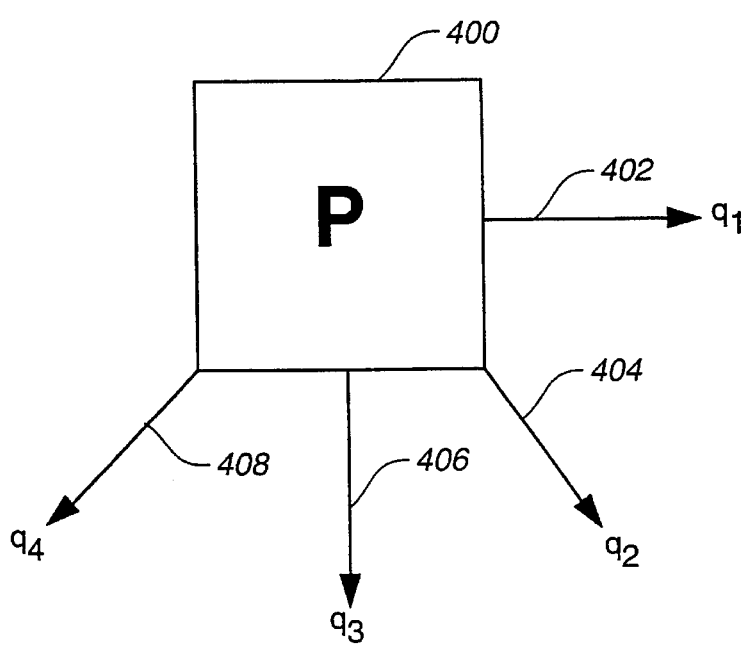
FIG._4A

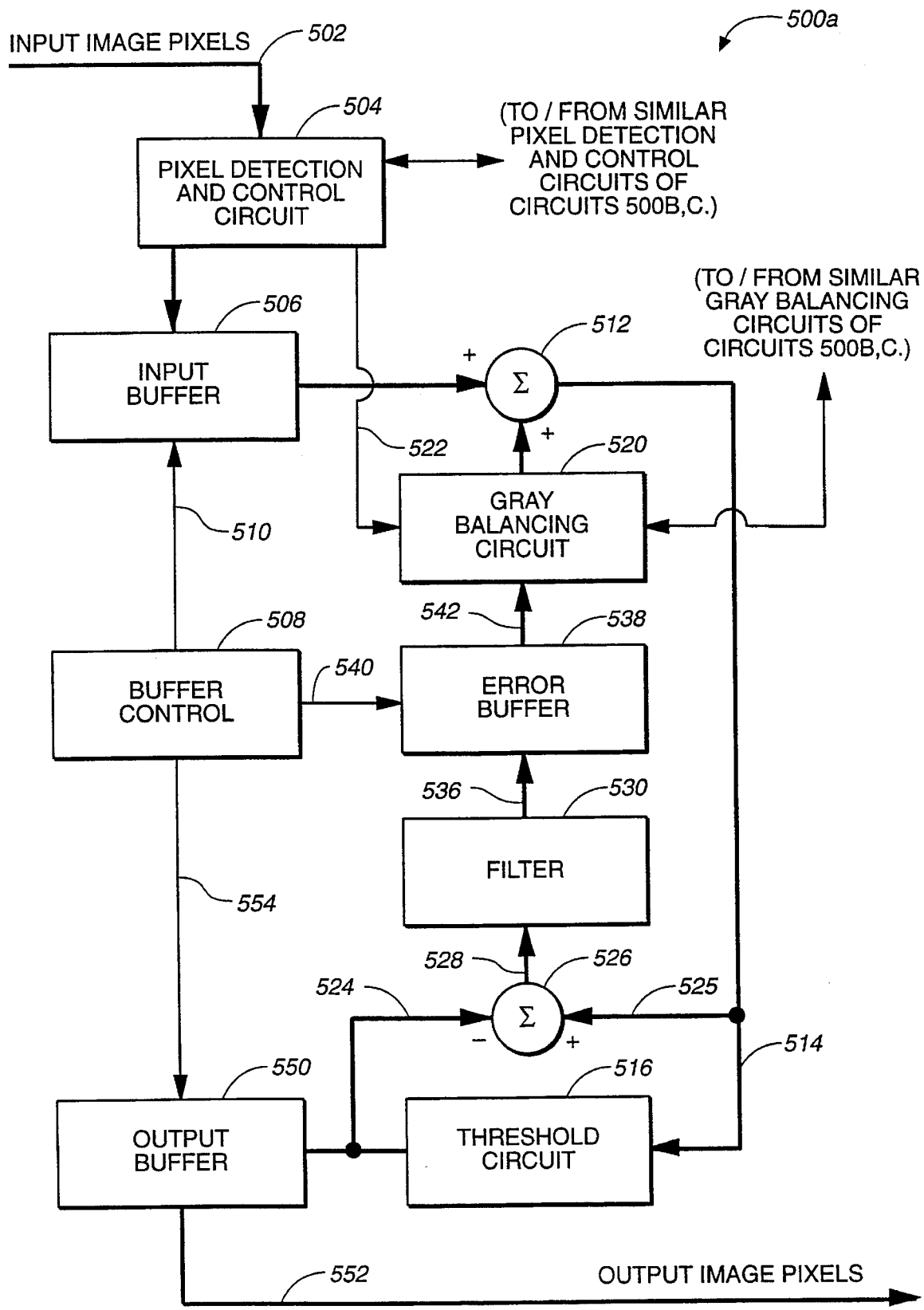
FIG._5

METHOD AND APPARATUS FOR REDUCING ARTIFACTS IN HALFTONE IMAGES USING GRAY BALANCE CORRECTION

CROSS REFERENCE TO RELATED APPLICATIONS

The following applications, filed on an even date herewith and assigned to the assignee of the instant application contain related subject matter to the instant application:

IMPROVED ADAPTIVE FILTERING AND THRESH-OLDINC ARRANGEMENT FOR REDUCING GRAININESS OF IMAGES, Ser. No. (112016-0004, AP006) filed by Joseph S. Shu;

IMPROVED METHOD AND APPARATUS FOR VIVID COLOR CORRECTION IN BINARY PRINTING DEVICES, Ser. No. (112016-0006, AP008) filed by Joseph S. Shu;

APPARATUS AND METHOD FOR ENHANCING COLOR SATURATION OF HALFTONED IMAGES, Ser. No. (112016-0007, AP009) filed by Joseph S. Shu;

IMPROVED METHOD AND APPARATUS FOR TONAL CORRECTION IN BINARY PRINTING DEVICES BY PREDISTORTION OF IMAGE DATA UTILIZING INK REDUCTION PROCESSING, Ser. No. (112016-0002P1, AP0011) filed by Joseph S. Shu;

IMPROVED METHOD AND APPARATUS FOR DITHER ARRAY GENERATION TO REDUCE ARTIFACTS IN HALFTONED IMAGE DATA UTILIZING INK REDUCTION PROCESSING, Ser. No. (112016-0003P1, AP0012) filed by Joseph S. Shu; and METHOD AND APPARATUS FOR MINIMIZING ARTIFACTS IN IMAGES PRODUCED BY ERROR DIFFUSION HALFTONING DATA UTILIZING INK REDUCTION PROCESSING, Ser. No. (112016-0001P1, AP0010) filed by Joseph S. Shu.

BACKGROUND OF THE INVENTION

1. Field of the Invention

The present invention relates to digital color printing devices, and in particular, to a technique for minimizing artifacts ("erroneous colored dots") in printed output of such devices, which artifacts are caused by error diffusion halftoning.

2. Description of the Related Art

Most computer-driven printing devices which generate hard copy, such as laser, dot-matrix and ink-jet printers, print in a binary fashion—the output medium is divided into an array of picture elements or "pixels" and the devices can either print a small colored dot at each pixel location or leave the pixel location blank. In the case of color printers, a dot color is chosen from a small set of colors. For example, a typical color printer may be configured to print three colors: cyan (C), magenta (M) and yellow (Y). By manipulating various combinations of CMY, additional colors such as blue (B), green (G), red (R) and black (K) may be generated. Each of these dots has a generally uniform color so that the resulting output consists of a total of eight arrayed colored and blank pixels, the latter pixel representing the color white (W).

Pictorial images such as those produced by photographic techniques or by computerized imaging systems, by contrast, are continuous in tonality. If such an image is divided into pixels, each pixel exhibits a "grayscale" color whose tonal value falls within a range of tonal values. In order to reproduce such "continuous-tone" images by means of electronic printing, the images must therefore be converted into a form which is suited to the characteristics of the printing device, generally a binary format. This conversion process, which may take many forms, is generically referred to as "halftoning." Although a halftone image actually consists solely of a spatial pattern of binary pixels (colored or blank dots), the human visual system integrates this pattern to create an illusion of a continuous-tone image.

During the printing process, the image to be printed is divided into a series of pixels and the value of the image in each pixel is quantized to produce a multi-bit digital word which represents the tonal value of the pixel. The image is thus converted to a stream of digital words which is provided to the printing device. In order to convert the format of each word into a format suitable for reproduction on the digital device, halftoning is performed on the digital word stream during a process called "preprocessing". Numerous halftoning techniques have been developed and refined over the years. In their simplest form, such techniques compare the value of each digital word with a threshold level, and generate a binary output pixel value depending on the relative values.

For example, a digital scanner processing a continuous-tone image generates a stream of multi-bit words representing the detected light intensities, i.e., pixel tonal values, typically for the colors RGB. The numerical value of these words generally ranges from 0 to 255 corresponding to a 256-level gray scale or an 8-bit word. If such a digital word stream is to be reproduced on a binary printing device, the halftoning process typically compares the scanner output words with a single threshold value to produce the required binary output pixel stream. (Illustratively, the fixed threshold value may be 128 for a grayscale value range between 0 and 255). In such a system, each 8-bit scanner word has effectively been compressed into a single-bit output word.

Naturally, such compression produces a significant loss of visual information and, in turn, creates visual distortions in the reproduced image that are not present in the original image. For example, overlaying the colors R=G=B as a single printed dot typically generates a "muddied" shade of gray that saturates the print medium (due of excessive ink buildup). To improve the production of gray, a technique known as "undercolor removal" has been developed that utilizes a separate black ink to create a gray halftone image preferably consisting of a spatial pattern of K and W dots.

According to this conventional technique, the lowest of the three RGB input color values is selected and replaced with K; thereafter, that lowest selected value is subtracted from the remaining two input color values. However, in the case where R=G=B, this combination is substituted for the color K. For example, if the values of the RGB output words from the digital scanner are:

| R | G | B |
|---|---|---|
| 100 | 100 | 100 | application of the undercolor removal technique produces the following sequence:

| R | G | B | K |
|---|---|---|---|
| 0 | 0 | 0 | 100 |

Halftoning is then performed on the resulting K color value. In order to reduce visual distortions created by the halftoning process, a technique known as "error diffusion" is employed to "diffuse" the "quantization error" (i.e., the difference between the input value represented by a multi-bit word and the output value represented by a single bit or two multi-bit words) proportionally among neighboring pixels.

This diffusion is performed on the resulting K color by adding a portion of the quantization error to the input values of the next pixel in the processing line and to neighboring pixels in the following line. The quantization error is added to the pixel values before processing so that the quantization error is "spread" over several pixels.

However, when employing undercolor removal before such processing, "diffused" errors that accumulate from previous pixels may revive the negated RGB colors and generate a "renewed" combination of RGB. When printed on the output medium, the resulting halftone image may once again be muddied (and the medium may be saturated) since black ink is now overlayed on the RGB colored dot.

In addition, the accumulation of previous diffusion errors may generate unwanted colors among pixels of the desired gray-tonal area. For example, although the three input color values of RGB are initially equal, after aggregating diffused errors from previously processed pixels, the values of the RGB color pixels may be altered to:

| R | G | B |
|---|---|---|
| 140 | 240 | 100 |

Comparing each of these words with the fixed threshold value of 128 results in the following halftone pattern:

| R | G | B |
|---|---|---|
| 1 | 1 | 0 |

Thus, a yellow dot is produced in what should be a predominantly gray area. This yellow dot, or "artifact", reduces the quality of the gray color in the resulting image.

Therefore, it is among the objects of the present invention to provide a method and apparatus for eliminating such artifacts from an image.

Another object of the present invention is to provide apparatus and a method of improving the quality of the halftone images produced by a binary printing device.

Still another object of the invention is to provide a method and apparatus which minimizes image artifacts due to error diffusion halftoning in the output images produced by a binary printing device, such as a color ink jet printer or laser printer.

Still yet another object of the invention is to provide such a method which can be implemented relatively easily either in specialized hardware or in existing printer drivers. Other objects will, in part, be obvious and will, in part, appear hereinafter.

DESCRIPTION OF THE INVENTION

Summary of the Invention

Briefly, the invention resides in a gray balance correction technique for eliminating artifacts from a predominantly "gray" tonal area of a halftone image. These artifacts are generally caused by the accumulation of diffusion errors which, after halftoning operations, produces colored dots that adversely affect the quality of the image. The gray balance correction technique described herein negates the generation of these artifacts to effectively expunge "foreign" colored dots from the gray image area.

Specifically, pixel tonal values associated with three input colors are initially examined to detect a condition that specifies production of a gray image area. In the illustrative embodiment, the input colors are preferably RGB and the condition being sought is R=G=B. Upon detecting this condition, errors from previously processed pixels are averaged prior to being "diffused" among these input color pixels. Thereafter, the input pixels are processed in accordance with conventional halftoning operations and the resulting binary pixel values are passed to an output buffer for printing. Averaging of the errors prior to error diffusion ensures that the condition R=G=B is maintained throughout preprocessing of those input color pixel values.

Advantageously, the inventive method can be incorporated easily into the driver software of a printing device at relatively little cost or embodied in specialized hardware in the printer port or the printer itself. When the inventive method is utilized high-quality halftone images can be produced by means of error diffusion halftoning with minimized artifacts.

BRIEF DESCRIPTION OF THE DRAWINGS

For a better understanding of the nature and objects of the invention, reference should be had to the following detailed description, taken in connection with the accompanying drawing, in which:

FIG. 1 is a block schematic diagram of a computer system, for example, a personal computer system on which gray balance correction operations using the inventive arrangement described herein can operate.

FIG. 2 is a schematic block diagram of a prior art computer system showing the relationship of an application program, an operating system and a printer driver in which the gray balance correction preprocessing operations are performed;

FIG. 3 illustrates a sequence for processing pixels in a conventional line processing pattern using error diffusion halftoning;

FIG. 4 illustrates an illustrative selection of proportional coefficients used in the error diffusion processing when pixels are processed in accordance with the pattern of FIG. 3;

FIG. 5 is a block schematic diagram of a modified error diffusion halftoning apparatus used for implementing the gray balance correction technique in accordance with the invention.

DETAILED DESCRIPTION OF AN ILLUSTRATIVE EMBODIMENT

The invention is preferably practiced in the context of an operating system resident on a personal computer such as the IBM PS/2 or Apple Macintosh computer. A representative hardware environment is depicted in FIG. 1, which illustrates a typical hardware configuration of a computer 100 in accordance with the subject invention. The computer 100 is controlled by a central processing unit (CPU) 102, which may be a conventional microprocessor; a number of other units, all interconnected via a system bus 108, are provided to accomplish specific tasks. Although a particular computer may only have some of the units illustrated in FIG. 1 or may have additional components not shown, most computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral devices such as a disk unit 113 and printer 114 to the bus 108, via cables 112 and 115, respectively. A user interface adapter 116 is also provided for connecting input devices, such as a keyboard 120 and other known interface devices including mice, speakers and microphones, to the bus 108. Visual output is provided by a display adapter 118 which connects the bus 108 to a display device 122 such as a video monitor. The computer 100 has resident thereon, and is controlled and coordinated by, an operating system.

A computer system such as that shown in FIG. 1 generally includes a printing device which is electrically connected to the computer system and controlled by it in order to generate a permanent image on a selected medium. In order to print a document which is displayed on the monitor or stored within the memory, several actions must take place. First, since the print medium generally has a fixed size, the printable information must be divided into pieces which are small enough to fit on the selected medium, a process which is called pagination. In addition, the information may need to be reformatted from the format in which it is either displayed or stored into a format which is suitable for controlling the printing device to actually perform the printing on the medium. The reformatting in this latter step may include a preprocessing step in which a graphical display is converted into the form used by the printing device by the halftoning operations discussed above.

The pagination and reformatting necessary to convert the printable information into a form which can be printed by a given printing device can be performed by specialized hardware, but are generally performed by software programs running within the computer system. The pagination is performed by either an application program which generated the initial output or by an operating system which is a collection of utility programs that perform basic file manipulation functions. The reformatting, including the undercolor removal and halftoning operations described above, are specific to the printing device and are usually contained in a software program called a "driver" which may be part of the operating system, but must be specifically associated with a particular printing device. The driver program receives textual and image information from the computer system and performs such processing operations to generate signals that can directly control the printing device.

For example, FIG. 2 is a schematic illustration of a typical computer system utilizing an application program, an operating system and a printer driver. The computer system is schematically represented by dotted box 200, the application program is represented by box 202 and the operating system by box 206. The interaction between the application program 202 and the operating system 206 is illustrated schematically by arrow 204. This dual program system is used on many types of computer systems ranging from mainframes to personal computers.

The method for handling printing, however, varies from computer to computer, and, in this regard, FIG. 2 represents a typical prior art personal computer system. In order to provide printing functions, the application program 202 interacts (as shown schematically by arrow 208) with printer driver software 2 10. The printer driver software 210 performs undercolor removal and halftoning operations to convert the multi-bit words representing numerical tonal values of typical input color pixels (e.g., RGB) into a binary output pixel stream representing selected of the colors RGBK. Furthermore, the driver software 210 may perform other operations to produce a reformatted information stream containing embedded commands and converted graphical information as shown schematically as arrow 214.

The converted information stream is, in turn, applied to a printer port 212 which contains circuitry that converts the incoming information stream into electrical signals. The signals are then sent over a cable 216 to the printer 218. Printer 218 usually contains an "imaging engine" which is a hardware device or a ROM-programmed computer which takes the incoming information stream and converts it into the electrical signals necessary to drive the actual printing elements. The result is a "hard copy" output on the selected medium. The apparatus which performs the error diffusion process may also be incorporated into specialized hardware located in the printer port 212 of the printer 218 itself.

The error diffusion process itself is well-known and is, for example, described in detail in "Digital Halftoning" by Robert Ulichney, printed by the MIT Press, Cambridge, Massachusetts and London, England, 1990, at pps. 239–319. During the error diffusion process, the pixels which comprise the original image are processed on a line-by-line fashion and, in each line, the pixels are processed in single direction (from left-to-right or right-to-left). A common line processing pattern is shown in FIG. 3 where each of the pixel lines 300, 302, 304, 306 and 308 is processed from left-to-right, then the next line is processed from left-to-right, and the following line is processed from left to right, etc. until the entire image is processed in the top to bottom direction.

FIG. 4 illustrates diffusion of the error generated during the processing of each pixel to neighboring pixels in the case where processing proceeds along the line in the left-to-right direction. In particular, each pixel is processed by comparing its value to a predetermined threshold value where the pixel "value" is the original grayscale value plus error adjustments resulting from the previous processing of other pixels. In the illustrative embodiment described herein, the fixed threshold value may be 128 for a grayscale value range between 0 and 255. If the value of the pixel exceeds the threshold value, then a "1" or dot is output. Alternatively, if the value of the pixel is less than the threshold value, then a "0" or no dot is output. An error value is then determined by subtracting the value of the dot which is actually output from the input value. This error is then "diffused" or spread among neighboring, but unprocessed, pixels.

This "diffusion" process is illustrated in FIG. 4 where the pixel being processed is depicted as box 400. In the illustrated arrangement, the error resulting from the processing is spread to the neighboring pixel to the immediate right of the processed pixel 400 (as indicated by arrow 402) and to three neighboring pixels on the next line of binary pattern pixels as indicated by arrows 404, 406 and 408. Before being added to the neighboring pixels, the error value is multiplied by a proportionality constant. The values of these constants, $q_1$ $q_2$ $q_3$ and $q_4$ are arranged such that $q_1+q_2+q_3+q_4=1$. Illustratively, the following weights may be used: $q_1=5/16$, $q_2=1/16$, $q_3=7/16$ and $q_4=3/16$. After pixel 400 has been processed, the neighboring pixel to the right of pixel 400 is processed by adding the proportionalized error value to the pixel value and processing it in the same manner as pixel 400. After each pixel in a line has been processed in this manner, the next line in the image is processed in the same manner.

As noted, execution of undercolor removal operations on input color pixels prior to error diffusion halftoning processing establishes generally tainted shades of gray when the tonal values of the input color pixels are equal. Moreover, reversing the order of these operations produces unwanted colors in the desired gray image area. The artifacts caused by the accumulation of diffusion errors adversely affect the gray tone of the resulting image and thus degrade the quality of that image. Accordingly, the gray balance correction technique of the present invention eliminates these artifacts from the gray image area, thus improving the quality of the image.

Specifically, the inventive technique examines the pixel tonal values associated with the RGB input colors to detect the condition R=G=B which generally specifies production of K and W "colored" dots. Upon detecting this condition, the errors from previously processed pixels are averaged prior to being "diffused" among these input color pixels. For example, assume the RGB input color pixels have the following tonal values:

TABLE 1

| R | G | B |
|---|---|---|
| 130 | 130 | 130 |

Clearly, the values of the input color pixels are equal and, as may be expected, it is desired that this relationship be maintained throughout the preprocessing operations (including conventional undercolor removal, which will not be discussed further herein) performed prior to outputting the processed color values to the printing device. Since the operative condition is detected, the errors from previously processed RGB pixels are averaged prior to diffusion among these RGB input pixels, and the average value of the errors is made equal to each of the RGB error values:

$$Rerr = Gerr = Berr = \frac{(Rerr + Gerr + Berr)}{3} \qquad \text{Equation 1}$$

In accordance with the teachings of the present invention, averaging of the errors prior to error diffusion ensures that the condition R=G=B is maintained throughout the preprocessing operations. Thus, if the errors Rerr, Gerr and Berr have the following values:

TABLE 2

| Rerr | Gerr | Berr |
|---|---|---|
| 50 | 110 | 86 | then the inventive gray balance correction technique described herein forces these errors to assume their average value of:

$$Rerr = Gerr = Berr = \frac{(50 + 110 + 86)}{3} = 82$$

Subsequent error diffusion processing results in each of the RGB input color pixels assuming a "processed" value of (130+82)=212. Thereafter, quantization in accordance with conventional halftoning operations using a threshold value of, e.g., 128, produces a binary value of "1" for the color K pixel and these values are then passed to an output buffer for printing.

FIG. 5 is an illustrative schematic block diagram depicting an error diffusion halftoning circuit modified in accordance with the principles of the invention. Preferably, there is one such circuit for each input (RGB) color pixel stream and, thus for the illustrative embodiment, there are three error diffusion halftoning circuits 500a–c. For ease of description and ease of depiction, only one of these circuits 500a will be shown and described.

The error diffusion circuit receives a stream of input grayscale image pixels represented by digital words from an imaging device (not shown) over line 502 in a conventional manner. The stream of image pixels is received by a pixel detection and control circuit 504 that is configured to other control elements of the circuit 500a. Specifically, as described further below, the pixel detection and control circuit 504 interacts with similar circuits of the error diffusion halftoning circuits 500b,c to collectively detect a condition whereby the values of each of three respective input image pixels are equal. In response to detecting this condition, the pixel detection and control circuit 504 generates an appropriate control signal for enabling arithmetic and logical operations within a gray balancing circuit 520, as described further herein.

The input image pixels pass serially through the detection and control circuit 504 and into a conventional input buffer 506. Buffer 506 is, in general, of sufficient size to store incoming image pixel words for an entire line of pixels although other buffer sizes are contemplated within the teachings of the invention. Buffer 506 is, in turn, controlled by buffer control circuit 508 (as indicated schematically by arrow 510) to output the stored values, in line order, to a summing circuit 512 that is configured to diffuse "error" values produced by the processing of previous pixels as described further below. In particular, under control of the buffer control circuit 508, buffer 506 can serially output the stored pixel data in a "left-to-right" order (last-in, first-out) in addition to outputting the stored pixel data in a "right-to-left" order (first-in, first-out), if desired.

The stored input data produced at the output of input buffer 506 is applied to a threshold circuit 516 by way of summing circuit 512 and line 514. The output of threshold circuit 516 is a quantized binary image (comprised of "0's" and "1's") which is produced by comparing the pixel values (each pixel "value" comprises the original input image value and "error" adjustments introduced by summing circuit 512) with a predetermined, fixed threshold value and outputting a "1" if the pixel value is greater than the threshold and outputting a "0" if the pixel value is less than or equal to the threshold value. Illustratively, the threshold circuit 516 may use a fixed threshold value such as 0.5 (for a grayscale value range between 0 and 1) or 128 (for a grayscale value range between 0 and 255).

The quantized binary signal generated by the threshold circuit 516 is applied, via output line 524, to a second summing circuit 526 which subtracts this quantized binary signal value from the unquantized input signal on line 525 to generate a quantization error value on line 528. This quantization error value is applied to filter circuit 530 which multiplies the error value by proportionality coefficients to generate diffused error values on line 536 for storage in error buffer 538. These diffused error values are subsequently added to predetermined neighboring pixels by summing circuit 512 during processing of the next line of pixels.

However, prior to being "diffused" among the neighboring pixels (such as the incoming pixels on line 502), the error value associated with each input color pixel is applied to a respective gray balancing circuit 520 according to the invention. The circuit 520 preferably operates in conjunction with similar circuits of the error diffusion halftoning circuits 500b,c to collectively average the error values generated by respective filter circuits. Accordingly, the pixel detection and control circuit 504 generates a control signal over line 522 to circuit 520 for averaging the error values as described above in response to detection of the condition, e.g., R=G=B.

It will be apparent to those skilled in the art that the circuits 504 and 520 contain circuitry (e.g., comparators, adders, registers, etc.) needed to implement the logical and arithmetic operations of detecting the "equivalent pixel value" condition and averaging the diffused error values (according to Equation 1) in order to generate correct binary pixel values for printing a gray-tonal image area. The exact circuit configurations of circuits 504 and 520, along with the exact arithmetic, logical and synchronizing operations performed by those circuits (and among similar circuits of error diffusion halftoning circuits 500b,c) can be varied without departing from the spirit and scope of the invention.

Error buffer 538 is also controlled by buffer control circuit 508 (as indicated schematically by arrow 540) to output selected stored values to gray balancing circuit 520 via output line 542. Under control of the buffer control circuit 508, error buffer 538 can serially output the stored pixel data in a "left-to-right" order (last-in, first-out) or it may output the stored pixel data in a "right-to-left" order (first-in, first-out) so as to match the error data with the input data being shifted out of input buffer 506.

During processing of a line of pixels, buffer control circuit 508 controls both input buffer 506 and error buffer 538 to sequentially provide an input pixel value from buffer 506 to summing circuit 512 and a diffused error value from error buffer 538 to summing circuit 512 via the gray balancing circuit 520. This summing circuit then provides sequentially error-diffused values to threshold circuit 516 which generates the quantized output. The output of the threshold circuit 516 is also provided to an output buffer 550 which is also controlled by buffer control circuit 508 (as indicated schematically by arrow 554). Output buffer 550 can then output a serial stream of binary pixels for provision to the printing device on line 552.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description as shown in the accompanying drawing shall be interpreted as illustrative and not in the limiting sense. It is also to be understood that the following claims are intended to cover all of the generic and specific features of the invention described herein.

What is claimed is:

1. A method for improving the quality of a halftone image generated as a result of preprocessing operations performed on a plurality of streams of continuous-tone input pixels, each stream comprising pixels having values of a specific tonal color, the method comprising the steps of:

converting first input pixels, one from each stream, into a plurality of first quantization errors;

detecting a condition wherein the tonal values of second input pixels, one from each stream, are equal;

collectively processing said first quantization errors in response to said detecting step such that each value of said first quantization errors is transformed to a value equal to the average of said first quantization errors; and summing said averaged first quantization value from each stream with a respective second input pixel tonal value from each stream so as to maintain said condition throughout the preprocessing operations and thereby improve the quality of the halftone image.

2. The method of claim 1 wherein said collectively processing step comprises the steps of:

adding the values of said first quantization errors; and dividing the sum of said added values by the total number of first quantization errors to produce said average first quantization value.

3. The method of claim 2 wherein said plurality of streams comprises three streams, one each for the colors RGB, and wherein said condition comprises R=G=B.

4. The method of claim 1 wherein said converting step comprises the steps of:

iteratively comparing the tonal values of said first input pixels with a threshold value;

selecting binary pixel values based on the comparison; and electronically storing error values defining the differences between said first input pixel values and the threshold value, said error values comprising said first quantization errors.

5. The method of claim 4 wherein said collectively processing step comprises the steps of:

adding the values of said first quantization errors; and dividing the sum of said added values by the total number of first quantization errors to produce said average first quantization value.

6. The method of claim 5 wherein said plurality of streams comprises three streams, one each for the colors RGB, and wherein said condition comprises R=G=B.

7. Apparatus for improving the quality of a halftone image generated as a result of preprocessing operations performed on a plurality of streams of continuous-tone input pixels, each stream comprising pixels having values of a specific tonal color, the apparatus comprising:

means for converting first input pixels, one from each stream, into a plurality of first quantization errors;

means for detecting a condition wherein the tonal values of second input pixels, one from each stream, are equal;

means for collectively processing said first quantization errors in response to said detecting means such that each value of said first quantization errors is transformed to a value equal to the average of said first quantization errors; and means for summing said averaged first quantization value from each stream with a respective second input pixel tonal value from each stream so as to maintain said condition throughout the preprocessing operations and thereby improve the quality of the halftone image.

8. The apparatus of claim 7 wherein said collectively processing means comprises a gray balancing circuit configured to average said first quantization errors by adding their values prior to dividing the sum of said added values by the total number of first quantization errors to produce said average first quantization value.

9. The apparatus of claim 8 wherein said plurality of streams comprises three streams, one each for the colors RGB, and wherein said condition comprises R=G=B.

10. The apparatus of claim 8 wherein said detecting means comprises a pixel detection and control circuit configured to generate a control signal for enabling said averaging of said first quantization errors in response to said condition.

11. The apparatus of claim 7 wherein said converting means comprises:

means for iteratively comparing the tonal values of said first input pixels with a threshold value;

means for selecting binary pixel values based on the comparison; and means for electronically storing error values defining the differences between said first input pixel values and the threshold value, said error values comprising said first quantization errors.

12. The apparatus of claim 11 wherein said collectively processing means comprises a gray balancing circuit configured to add the values of said first quantization errors prior to dividing the sum of said added values by the total number of first quantization errors to produce said average first quantization value.

13. The apparatus of claim 12 wherein said plurality of streams comprises three streams, one each for the colors RGB, and wherein said condition comprises R=G=B.

14. The apparatus of claim 13 wherein said detecting means comprises a pixel detection and control circuit configured to generate a control signal for enabling said averaging of said first quantization errors in response to said condition.

15. A system for eliminating artifacts from a generally gray-tonal area of a halftone image, the artifacts being generated as a result of preprocessing operations performed on a plurality of streams of continuous-tone input pixels, each stream comprising pixels having values of a specific tonal color, the system comprising:

means for converting first input pixels, one from each stream, into a plurality of first quantization errors;

a pixel detection and control circuit for detecting a condition wherein the tonal values of second input pixels, one from each stream, are equal;

a gray balancing circuit for collectively processing said first quantization errors in response to said detecting means such that each value of said first quantization errors is transformed to a value equal to the average of said first quantization errors; and means for summing said averaged first quantization value from each stream with a respective second input pixel tonal value from each stream so as to maintain said condition throughout the preprocessing operations and thereby improve the gray-tone quality of the halftone image.

16. The system of claim 15 further comprising an input buffer for storing the tonal pixel values of said first and second input pixels, and wherein each of said pixels is selected from the buffer.

17. The system of claim 16 wherein said converting means comprises:

a threshold circuit for iteratively comparing the tonal value of each first input pixel with a threshold value;

an error buffer for storing an error value defining the difference between the first input pixel value and the threshold value; and an error filter circuit for diffusing the error value among neighboring pixels of each stream.

18. The system of claim 17 wherein the error buffer stores the error values of an immediately previous series of pixels, and wherein the error values are selected from the error buffer.

19. The system of claim 18 further comprising a buffer control circuit for controlling one of the input buffer to output selected stored pixel values to said summing means and the error buffer to output selected stored error values to said gray balancing circuit.

20. A computer system comprising:

a memory for storing data and programs;

a central processing unit responsive to programs stored in the memory for controlling and coordinating the operation of the computer system;

digitizing means responsive to a continuous-tone image for generating streams of electronically encoded pixel values, each stream comprising pixels having values of a specific tonal color, each pixel representing a grayscale value of a portion of the continuous-tone image;

an input buffer responsive to the streams of electronically encoded pixel values for storing respective electronically encoded pixel values of a current series of pixels for each stream and of previous series of pixels for each stream;

a pixel detection and control circuit for detecting a condition wherein the values of the respective pixels of the current series for each stream are equal;

means for generating quantization errors for the previous series of pixels, the quantization errors adapted for diffusion among the current series of encoded pixel values of the stream;

a gray balancing circuit for collectively processing the quantization errors in response to the detected condition such that the values of the quantization errors are transformed to values equal to the average of the quantization errors;

means for aggregating the averaged quantization error values with respective electronically encoded pixel values of the current series of pixels;

means for quantizing the aggregated grayscale values of the current series of pixels into a halftone pattern; and a printer responsive to the aggregated grayscale values for printing the halftone pattern of monochrome dots on a print medium to generate a halftone image.

* * * * *